Jan. 28, 1964    W. MITCHELL, JR    3,119,473
JOINT FOR SHEET METAL AND THE LIKE AND METHOD OF FORMING SAME
Filed Aug. 2, 1962
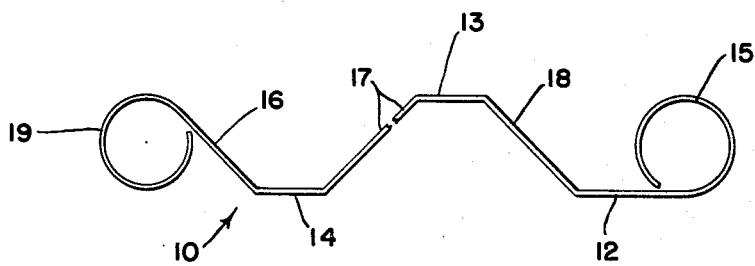
FIG. 1
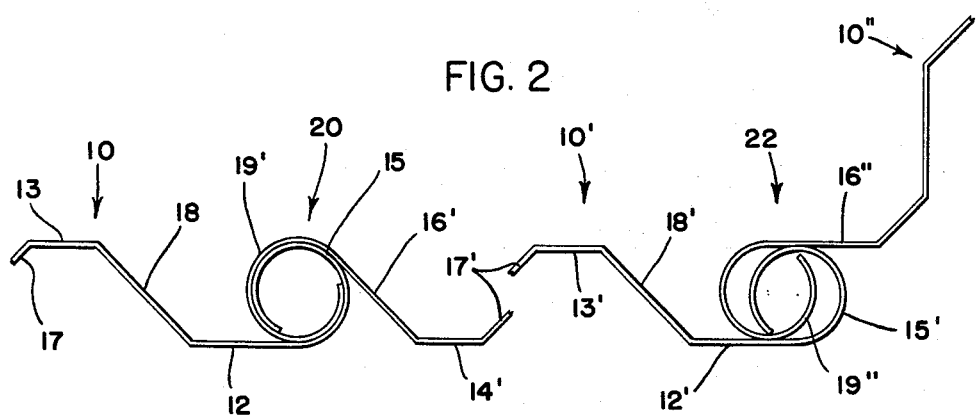
FIG. 2
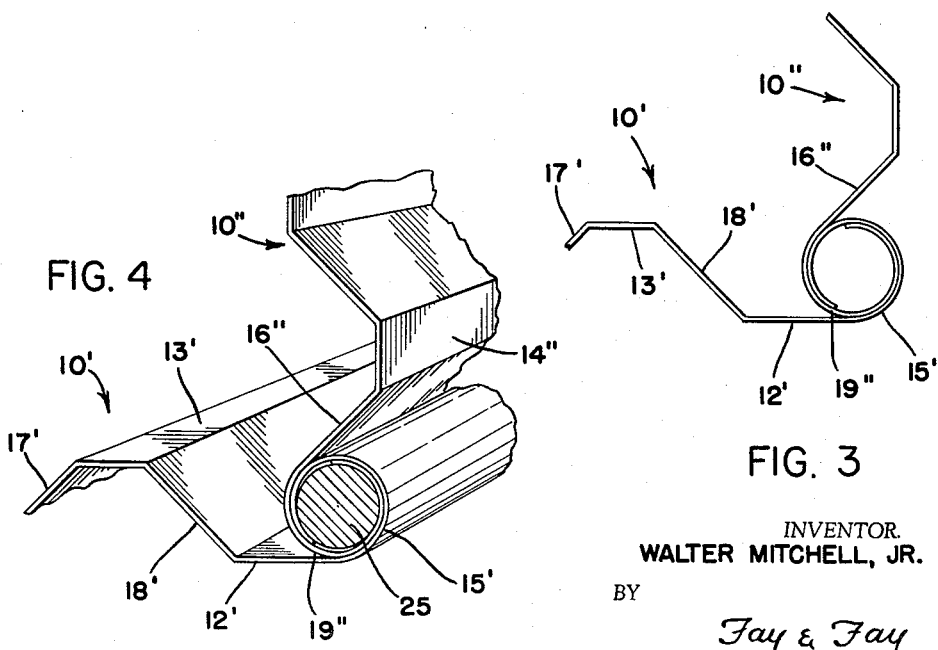
FIG. 3
FIG. 4
INVENTOR.
WALTER MITCHELL, JR.
BY
*Fay & Fay*
ATTORNEYS United States Patent Office 3,119,473
Patented Jan. 28, 1964

3,119,473
JOINT FOR SHEET METAL AND THE LIKE AND METHOD OF FORMING SAME
Walter Mitchell, Jr., Owenoke, Westport, Conn.
Filed Aug. 2, 1962, Ser. No. 214,379
5 Claims. (Cl. 189—36)

This invention relates to a joint for sheet metal materials and the like and a method of assembling the same. It is useful particularly in connection with building panels and outdoor structures. The joint of the invention is novelly provided so that by a simple operation of sliding assembly of the panels and locking by relative rotation of the panels, a strong joint between the sheet metal panels may be formed.

The joints may be conveniently made to secure the panels at 180° angles for wall joints and at 90° angles for corner joints, and at several other angles of varying degrees.

In general, the joint is characterized by a first sheet metal module having a plane surface portion terminating in an adjacent rounded bead conformation which defines a circular arc of at least 330°, and a second module having a plane surface portion terminating in an adjacent rounded bead conformation which defines a circular arc of at least 330°. The rounded bead conformations of the modules are telescopingly nested in substantially coaxial mutually deformed relation with the respective plane portions of the first and second modules, or extensions thereof, forming an acute angle with one another when in the locked position. It being noted that as used herein, a plane has no finite length.

The joint is originally slidingly assembled into the unlocked position with the adjacent plane portions of the modules, from which the rounded bead conformations originate, oriented in substantially parallel relationship, and the locking operation then is accomplished by relative rotation through an angle of approximately 45° in either direction from this approximately parallel relationship.

Because of this method of assembly, in order to get panels locked for 90° corner joints or 180° wall joints, the invention contemplates that the modules be provided with the bead conformation originating plane surface portions oriented with respect to the lands or major portions of the modules at different angles. The originating plane of the bead conformation of one module of the joint being in the major plane of said one module, in the form of a land in the ribbed type sheet, for instance; and the originating plane of the bead conformation of the other module of the joint being at an angle of substantially 45° with respect to the major planes or lands of the said other module in the form of a transverse portion in the ribbed type sheet, for instance. This insures that when the originating planes or plane surface portions adjacent the rounded bead conformations are originally telescoped together in an approximately parallel relation to each other and subsequently are rotated substantially 45° into the locked position, the major planes or lands of the modules or extensions thereof start from an acute angle of approximately 45° with respect to one another and end up when in the locked positions at angles relative to each other of approximately 90° for corner joints and approximately 180° for wall joints.

The relative rotation required for locking, of course, may be varied from 45° within limits of plus or minus 35° depending on the manufacturing tolerances obtained and the degree of approximation to parallel relation between the originating planes accomplished during the original telescoping assembly operation.

The rounded bead conformations at either end of the modules define circular arcs of at least 330° and may approach 360° so long as there is sufficient clearance between the end of the bead conformation and the originating plane or adjacent plane surface portion to permit the thickness of the material of the mating conformation to be received therebetween. Accordingly, the joints provided and assembled according to the principles of this invention may be used in connection with the assembly of long or short panels and may be fabricated from standard commercial ribbed sheet or flat sheet, it being necessary only to insure that the circular bead conformations are of at least 330° and of substantially the same diameter with their adjacent plane surface portions or bead conformation originating planes forming an acute angle with one another when the major portions of the sheets or modules are oriented at 90° or 180° with respect to one another. The acute angle being of the order of 45° plus or minus 35°.

It will be seen from the description that follows that only one set of dies are necessary to make the rounded bead conformations since they are provided of equal diameter and are mutually deformed during assembly. This, of course, permits the use of a single type of modular panel with the two originating planes at substantially 45° to each other for assembly of either 90° corner joints or 180° wall joints.

The invention is particularly adapted for use with commercially ribbed sheets which are highly desirable because of the stiffness they provide and because the curl may be within the depth of the ribs and substantially tangent to the two imaginary planes which include the lands that make up the outer thickness dimensions of the ribbed sheet.

Thus, it will be seen that the joints and method of assembly of this invention provide an easy manner of construction and assembly of prefabricated buildings such as might be used for utility purposes or low-cost, storm-proof tropical housing. The reason for this is that these joints are capable of easy telescoping assembly and locking by relative rotation by one man with no tools or special fasteners and also because the resulting joint is strong and weather-tight and may be easily fabricated from commercially available panels. It should be noted that during assembly, the relative rotation, which nests the bead conformations of the adjacent modules in locked substantially coaxial mutually deformed relation, results in very little frictional resistance to the rotation into either a 90° corner joint position or a 180° wall joint position.

An object of this invention is to provide a new and improved sheet metal joint for use in connection with building panels and the like that provides simple sliding assembly of panels and firm weather-tight locking by simple relative rotation of the slidingly assembled panels.

A further object of this invention is to provide a new and improved joint and method of constructing said joint for use in connection with panels for easy assembly of prefabricated building structures by one man without the use of tools or special fasteners.

To the accomplishment of the foregoing and related ends, said invention then consists of the means hereinafter fully described and particularly pointed out in the claims; the following description setting out in detail one improved means of carrying out the invention. The disclosed means, however, constitutes but one of the various ways in which the principles of the invention may be used. This application is a continuation in part of U.S. application, Serial No. 811,440, filed May 6, 1959, now abandoned, by Walter P. Mitchell, Jr.

FIG. 1 is a fragmentary cross-sectional view of a commercially ribbed panel provided with rounded bead conformations for use in constructing a joint according to the principles of this invention.

FIG. 2 is a fragmentary cross-sectional view illustrating an assembled 180° wall joint and a telescopingly partially assembled joint utilizing the panels of the type illustrated in FIG. 1.

FIG. 3 is a cross-sectional view of an assembled 90° corner joint using the panels of the type illustrated in FIG. 1.

FIG. 4 is a perspective view of the joint of FIG. 3 with a circular dowel secured within the coaxially nested and mutually deformed bead conformations.

In general, the panel of the illustrated embodiment comprises a commercially ribbed sheet of aluminum or some similar material having spaced parallel planes or lands 12, 13, and 14 respectively on opposite sides thereof interconnected by intermediate transverse portions 16, 17, and 18 which are transversely oriented at approximately 45° with respect to each of the lands, 12, 13, and 14.

Originating from the land 12 is a rounded bead conformation which defines a circular arc of at least 330°. This rounded bead conformation is located substantially within the outside dimension between the lands 13 and 14 and is a continuation of the land or adjacent plane surface portion 12. At the opposite end of the panel, the transverse plane surface portion 16 terminates in an adjacent rounded bead conformation 19 of substantially identical shape and dimension as that of bead 15.

Both of the conformations 15 and 19 are made for convenience of an outside diameter which is substantially equal to the overall thickness between the lands 12, 13, and 14 of the panel 10 such that the joint formed by using the panel as a module will lie substantially within the overall dimensions of the modules used. It should be recognized that this is a matter of choice; however, and other diameters for the circular bead conformation may be utilized without substantially changing the principles of the invention.

FIG. 2 illustrates an assembled wall joint in which the major planes or lands of the modules or panels 10 and 10' make up an assembled 180° wall joint 20, and the panels 10' and 10" are shown in their initial slidingly telescoped positions ready for the locking step of approximately 45° of rotation to either form a 180° wall joint or a 90° corner joint or some other suitable joint at which the originating planes 16" and 12" will lie within planes which intersect at an acute angle.

It will be seen from the joint 20 in FIG. 2 formed by the modules 10 and 10' and the semiassembled joint 22 of FIG. 2 formed by the modules 10' and 10" that a clearance between the end of the circular conformations and their originating plane must be provided to permit the thickness of the mating module to pass therethrough for ultimate coaxial nesting in mutually deformed relation to each other. It is this concept which insures that the joint is strong and weather-tight while permitting its assembly by a simple telescopingly sliding action and subsequent locking rotation.

As will be apparent, the joint 20 formed by the circular bead conformations 19' and 15 has been assembled by first placing the plane surface portions or bead conformation originating plane portions 12 and 16' respectively into a parallel position as illustrated in the partially assembled joint 22 as existing between the originating plane portion 12' of the module 10' and the originating plane portion 16" of the module 10". After being placed in this parallel relationship with the bead conformations 15 and 19' slidingly telescoped together, similar to the manner illustrated in semiassembled joint 22, the module 10' was rotated substantially 45° downward in a clockwise direction as seen in FIG. 2 to the locked position to form the 180° wall joint 20 having mutually deformed bead conformations in coaxial alignment.

In FIG. 3 is seen a 90° corner joint which includes the bead conformations 19" and 15' of the module panels 10" and 10' locked by rotation from the semiassembled position illustrated in FIG. 2, approximately in a counter-clockwise direction upwardly as seen in FIG. 2. In this locked position, the bead conformations 19" and 15' are mutually deformed and nested into coaxial relationship to form the locked corner joint.

FIG. 4 is a perspective view of the 90° corner joint illustrated in FIG. 3 as formed by the conformations 15' and 19". In addition to the locked 90° corner joint as shown in FIG. 3, however, a dowel 25 of plastic, metal, or wood, or some other suitable material has been snugly located within the elongated hollow opening formed by the bead conformations 19" and 15' to give the joint increased load-bearing properties.

The dowel utilizing modification has been found to be desirable where additional load-bearing capacity is desired; however, in the normal building fabrication joint constructed according to the principles of this invention, it is not necessary to provide a dowel 25 in the various joints of the structure. The reason for this is that the bead conformations of at least 330° which are constructed according to the principles of this invention, particularly when used in conjunction with a formed sheet such as the ribbed siding modules illustrated, will have sectional properties equal to or exceeding those of the sheet and will be a rattle-free and weather-tight corner and wall joint of superior dynamic load resisting characteristics.

In connection with this invention, by way of example, various tests of the joint as disclosed in the illustrated embodiment of FIGS. 1 to 3 have been conducted in which two panels of approximately 32 inch width and 84 inch length were assembled to make up a typical 90° corner. The panels were telescopically slipped together and rotated 90° in the manner explained above without the use of special fasteners or tools. A support frame was constructed to allow top and bottom fastening, but no intermediate supports or fasteners were used. The mock-up was placed in the center of a windstream from a wind generator in a vertical position such as a building corner would be. The sides, top, and bottom of the mock-up frame were sealed so that water penetration could only occur at the joint under test. No caulking was used in the joint, and an observer stood behind the test specimen during the test to record the results thereof.

In conducting the test, the joint was subjected to winds from a 1200 H.P. Pratt & Whitney aircraft engine with the propeller 18' from the corner of the panel. The wind velocity attained was read on a Pitot tube located 4' behind the propeller and 6' above the base. Water was injected into the windstream from a circular tube located behind the engine and concentric with the propeller shaft.

*Test Conditions and Results*

Dynamic wind test: Dry.
　Duration of test: 10 minutes.
　Schedule of velocities: 50 m.p.h.
　Water added to airstream: None.
　Results: Visible flutter in sheets at midpoints. No visible vibration of corner joint. No perceptible air penetration. No damage resulted from this test.
Dynamic wind test: Wet.
　Duration of test: 9 minutes.
　Schedule of velocities: 3 minutes at 50 m.p.h.; 3 minutes at 80 m.p.h.; 3 minutes at 120 m.p.h.
　Water added to airstream: 20 gals. per minute.
　Results: Vary degrees of flutter in sheets at each velocity. No visible vibration of corner joint at 60 m.p.h. or 80 m.p.h. Dropwise leak occurred at 120 m.p.h. at a point 22" from bottom of sheets (see comments). No damage resulted from this test.
Comments: This joint test was to determine its resistance to wind driven rain. The leak which developed at 120 m.p.h. was located at a point where the inner "curl" of the lock had a slight wave. The rest of the joint was completely free from penetration.

Accordingly, my invention generally relates to a superior joint for utility buildings and other modular structures and the manner in which they may be formed to be mutually supporting, rattle-free, and weather-tight without the use of special fasteners in the joint or tools for assembly. By means of this joint in which the 330° curls are mutually deformed and nested in coaxial relation by being slidingly telescoped and then rotationally locked, a very economical modular structure can be furnished, for instance, for use as a utility building or low-cost tropical housing unit.

It should be apparent from a view of FIG. 1 of the drawings, for instance, that the major portions or bodies of the modules may be of practically any shape provided the plane portions adjacent the bead conformations from which said conformations originate are oriented at substantially 45° to one another. Notice by way of example, that the panel illustrated in FIG. 1 could easily be provided without the rib formed by the transverse plane portion 17 and 18 and the land 13. Instead, the plane defined by the lands 12 and 14 could form one continuous flat sheet or some other module body configuration intermediate the originating plane portions 12 and 16. This versatility permits the joint of the invention to be adapted for use in a variety of applications since the economies desired may be accomplished by the utilization of only one set of dies to form the equal and similar curls on either end of the modules. Moreover, the telescoping assembly operation and subsequent relative rotational locking operation are desirable as an efficient way to form rattle-proof and weather-tight fabricated 90° corner joints, 180° wall joints, or other appropriate joints to which the particular modules utilized may be adapted by use of the principles of this invention.

It is, of course, immaterial what size the bead conformations are as long as they are circular, of equal diameter, and curl at least 330° with sufficient clearance between the end of the curl and its originating plane to permit the thickness of the material of the mating curl to be received therein. The criticality of at least 330° in the curls and their substantial mutual deformation has been observed as important to the effective relatively thin cross-sectional dimension or gauge of sheet normally utilized in forming the modular panels. As observed in the above-reported tests, this then material is subject to flutter and other undesirable deformation upon the application of a dynamic load such as is created by a strong wind on a structure. Without the stated degree of curl and the disclosed concept of mutual deformation of the bead conformations out of their free state, this undesirable deformation is transferred to the joint and produces excessive rattling and leakage in the joint. Also of importance in providing the disclosed amount of curl and mutual deformation of the mating curls is the fact that forces applied in any lateral or substantially radial direction with respect to a particular joint, even using extremely thin sheet material for the modules, will not disturb the integrity of the joint since the only force which can unlock the joint is a reverse rotational force in the direction opposite to the rotational locking force used during assembly of the joint. To be able to provide these desirable results without the necessity of special tools or complicated assembly operations is extremely important in the construction art and has been unattainable by use of prior art methods and joints.

Although the present invention has been described in connection with but a few illustrative embodiments thereof, variations and modifications may be resorted to by those skilled in the art without departing from the principles of the invention; and all these variations and modifications are considered to be within the true spirit of the scope of the present invention as disclosed in the foregoing specification and defined in the appended claims.

The invention claimed is:

1. A joint for sheet metal and the like comprising:
   a first module having a first plane surface portion and a second plane surface portion angularly related to the first portion terminating in an adjacent rounded bead conformation which defines a circular arc of at least 330°,
   a second module having a plane surface portion terminating in an adjacent rounded bead conformation which defines a circular arc of at least 330°,
   said rounded bead conformations being telescopingly nested in substantially mutually deformed relation with the intersection of extended planes of respective plane portions adjacent the rounded bead conformation of said first and second modules oriented at an acute angle with respect to one another.

2. The joint of claim 1 in which at least one of said modules has a second plane surface portion terminating in a rounded bead conformation and oriented at an acute angle with respect to the plane surface portion of said one module which terminates in one of said nested and mutually deformed rounded bead conformations.

3. The joint of claim 2 in which at least said one module has a plurality of projecting ribs and said rounded bead conformations lie substantially within the overall depth dimension of said module defined by the extremes of said projecting ribs.

4. The joint of claim 3 in which the said projecting ribs of said one module are defined by a plurality of angularly interconnected planes and said plane surface portions of said one module are rib defining planes of separate ribs.

5. A joint for sheet metal and the like comprising:
   a first elongated module having angularly oriented plane surface portions adjacent opposite ends thereof,
   each of said plane surface portions of said first module terminating in an adjacent rounded bead conformation which in its free state defines a circular arc of at least 330° and which is equal to the rounded bead conformation adjacent the other of said plane surface portions on said first module,
   a second elongated module having angularly oriented plane surface portions adjacent opposite ends thereof,
   each of said plane surface portions of said second module terminating in an adjacent rounded bead conformation which in its free state defines a circular arc of at least 330° and which is equal to the rounded bead conformation adjacent the other of said plane surface portions of said first and second modules,
   one of said rounded bead conformations of said first module being radially deformed out of the said free state and nested in substantially coaxial relation to one of said rounded bead conformations of said second module which is radially deformed out of the said free state in a substantially equal and opposite direction from that of the coaxially nested bead of said first module, the extended planes of the angularly oriented plane surface portions adjacent a nested bead forming an acute angle.

References Cited in the file of this patent

UNITED STATES PATENTS

| | | |
|---|---|---|
| 567,666 | Tallerday | Sept. 15, 1896 |
| 697,943 | Jackson | Apr. 15, 1902 |
| 859,295 | Hill | July 9, 1907 |
| 892,615 | Perry | July 7, 1908 |
| 1,062,994 | Pruden | May 27, 1913 |
| 1,170,691 | Skipworth | Feb. 8, 1916 |
| 1,176,294 | Hill | Mar. 21, 1916 |